US011150224B2

(12) United States Patent
Fogwill et al.

(10) Patent No.: US 11,150,224 B2
(45) Date of Patent: Oct. 19, 2021

(54) SYSTEM AND METHOD FOR SAMPLE INTRODUCTION WITHIN A CHROMATOGRAPHY SYSTEM

(71) Applicant: Waters Technologies Corporation, Milford, MA (US)

(72) Inventors: Michael O. Fogwill, Uxbridge, MA (US); Joseph D. Michienzi, Plainville, MA (US)

(73) Assignee: Waters Technologies Corporation, Milford, MA (US)

( * ) Notice: Subject to any disclaimer, the term of this patent is extended or adjusted under 35 U.S.C. 154(b) by 71 days.

(21) Appl. No.: 16/425,004

(22) Filed: May 29, 2019

(65) Prior Publication Data
US 2019/0369062 A1 Dec. 5, 2019

Related U.S. Application Data

(60) Provisional application No. 62/677,812, filed on May 30, 2018.

(51) Int. Cl.
*G01N 30/32* (2006.01)
*G01N 30/16* (2006.01)
*G01N 30/60* (2006.01)

(52) U.S. Cl.
CPC ............ *G01N 30/32* (2013.01); *G01N 30/16* (2013.01); *G01N 30/606* (2013.01); *G01N 30/6017* (2013.01); *G01N 2030/326* (2013.01)

(58) Field of Classification Search
CPC .... B01D 15/40; B01D 15/14; B01D 15/1864; B01D 15/1885; G01N 30/32; G01N 30/16;
(Continued)

(56) References Cited

U.S. PATENT DOCUMENTS

| 2014/0014585 A1* | 1/2014 | Dourdeville | G01N 30/82 |
| | | | 210/656 |
| 2016/0375376 A1* | 12/2016 | Wikfors | B01D 15/163 |
| | | | 210/198.2 |

FOREIGN PATENT DOCUMENTS

WO  2018022958 A1  2/2018

OTHER PUBLICATIONS

Chester et al. "Pressure-regulating fluid interface and phase behavior considerations in the coupling of packed-column supercritical fluid chromatography with low-pressure detectors." J. Chromatogr. A. 807.2(1998)265-273.
(Continued)

*Primary Examiner* — Ryan B Huang
(74) *Attorney, Agent, or Firm* — Womble Bond Dickinson (US) LLP; Deborah M. Vernon; Heath T. Misley

(57) ABSTRACT

The present disclosure relates to methodologies, systems, apparatus, and kits for introducing a sample within a chromatography system. A makeup pump is configured to pump a makeup fluid through a first restrictor into the chromatography system upstream of the column and downstream of a mobile phase pump. The first restrictor is located upstream of a column and downstream of makeup pump and a sample fluid pump. Decreasing an output volume of the makeup pump can direct a sample fluid from the sample fluid pump through the first restrictor to the column. Increasing an output volume of the makeup pump can direct the sample fluid to a second restrictor located downstream of the makeup pump and in parallel with the column and the detector.

13 Claims, 10 Drawing Sheets

(58) Field of Classification Search
CPC ........... G01N 2030/385; G01N 30/167; G01N 30/20; G01N 2030/20; G01N 2030/201; G01N 2030/202
See application file for complete search history.

(56) References Cited

OTHER PUBLICATIONS

International Search Report issued in International Application No. PCT/IB2019/054455 dated Sep. 30, 2019.
Written Opinion issued in International Application No. PCT/IB2019/054455 dated Sep. 30, 2019.

* cited by examiner

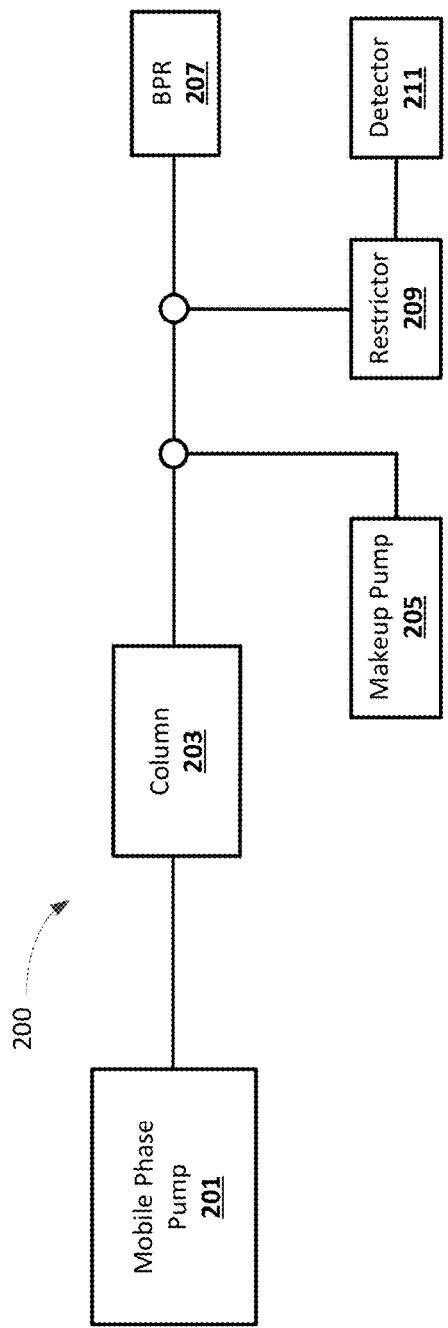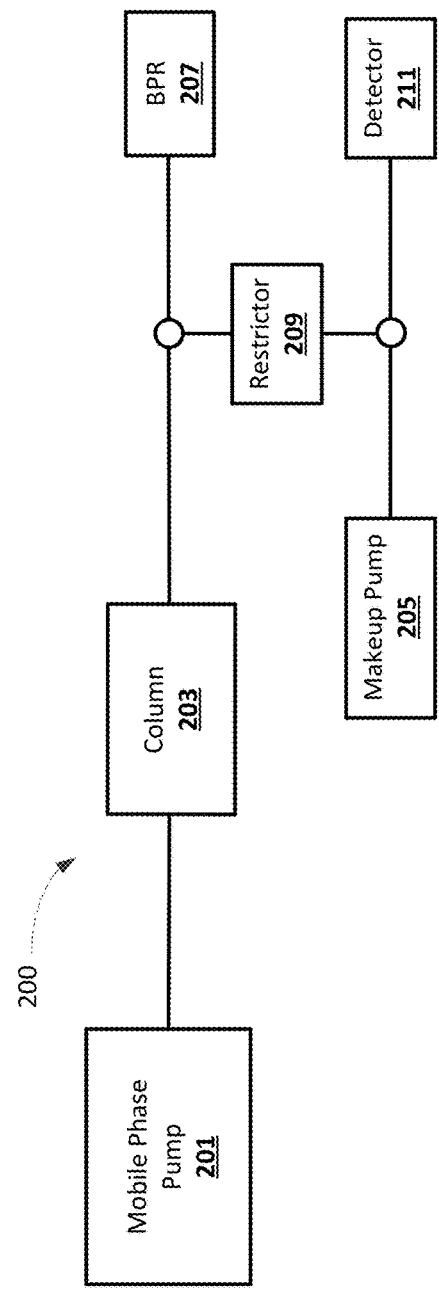

SYSTEM AND METHOD FOR SAMPLE INTRODUCTION WITHIN A CHROMATOGRAPHY SYSTEM

CROSS-REFERENCE TO RELATED APPLICATION

This application claims benefit of and priority to U.S. Provisional Patent Application No. 62/677,812 filed May 30, 2018, the entire contents of which is hereby incorporated herein in its entirety.

FIELD OF THE TECHNOLOGY

The present disclosure generally relates to pressurized fluid systems used in chromatography. In particular, the present disclosure relates to systems and methods for introducing a sample in a chromatography system.

BACKGROUND

Chromatography involves the flowing of a mobile phase over a stationary phase to effect separation. To speed-up and enhance the efficiency of the separation, pressurized mobile phases are introduced. Carbon dioxide based chromatographic systems use $CO_2$ as a component of the mobile phase flow stream, and the $CO_2$ based mobile phase is delivered from pumps and carried through the separation column as a pressurized liquid. The $CO_2$ based mobile phase is used to carry components of the analytes in a sample through the chromatography column to the detection system.

Chromatography systems often use a restrictor to interface to the detection system. The restrictor can be used to maintain system pressure and to regulate or introduce a portion of the mobile phase flow to the detection system.

SUMMARY

Introducing a sample fluid and diverting mobile phase flow within a chromatography system raises a number of challenges, especially when dealing with a highly compressible mobile phase, such as a $CO_2$-based mobile phase. Technology for smoothly introducing a sample fluid and redirecting mobile phase flow with limited pressure changes would be beneficial and highly desirable.

According to one aspect of the technology, the present disclosure relates to a method for introducing a sample within a chromatography system. The method includes activating a mobile phase pump configured to pump a mobile phase to a column. The method also includes activating a makeup pump configured to pump a makeup fluid into the chromatography system upstream of the column through a first restrictor. The method also includes introducing a sample fluid to an output from the makeup pump upstream of the first restrictor. The method also includes measuring a pressure across the first restrictor, wherein the first restrictor is located upstream of the column and a detector and downstream of the makeup pump. The method also includes decreasing an output volume of the makeup pump in order to direct a portion of the sample fluid through the first restrictor and to the column and the detector. The method also includes increasing an output volume of the makeup pump in order to direct the sample fluid to a second restrictor located downstream of the makeup pump and in parallel with the column and the detector. In a non-limiting example, the chromatography system is a $CO_2$-based chromatography system including a $CO_2$-based mobile phase. In another non-limiting example, a maximum flow value of the first restrictor determines a maximum amount of fluid directed to the column. In another non-limiting example, decreasing the output volume of the makeup pump below the maximum flow value of the first restrictor directs a portion of the sample fluid through the first restrictor and to the column and the detector. In another non-limiting example, the makeup pump is configured to pump a makeup fluid having a same composition as a mobile phase solvent entering the column. In another non-limiting example, controlling the output volume of the makeup pump can selectively direct the sample fluid to the column. In another non-limiting example, measuring the pressure across the first restrictor includes measuring the pressure using pressure sensors located upstream and downstream of the first restrictor.

According to another aspect of the technology, the present disclosure relates to a system for introducing a sample within a chromatography system. The system includes a mobile phase pump configured to pump a mobile phase to a column. The system also includes a makeup pump configured to pump a makeup fluid into a chromatography system upstream of the column. The system also includes a first restrictor located downstream of the makeup pump and upstream of the column and the detector. The system also includes a sample fluid pump configured to introduce a sample fluid into an output from the makeup pump upstream of the first restrictor. The system also includes a second restrictor located downstream of the makeup pump and the sample fluid pump and in parallel with the column and the detector. The system also includes a computing device configured to measure a pressure across the first restrictor and control an operation of the makeup pump in order to: decrease an output volume of the makeup pump in order to direct a portion of the sample fluid through the first restrictor and to the column and the detector; and increase an output volume of the makeup pump in order to direct the sample fluid to the second restrictor. In a non-limiting example, the chromatography system is a $CO_2$-based chromatography system including a $CO_2$-based mobile phase. In another non-limiting example, a maximum flow value of the first restrictor determines a maximum amount of fluid directed to the column. In another non-limiting example, decreasing the output volume of the makeup pump below the maximum flow value of the first restrictor directs a portion of the sample fluid through the first restrictor and to the column and the detector. In another non-limiting example, the makeup pump is configured to pump a makeup fluid having a same composition as a mobile phase solvent entering the column. In another non-limiting example, the computing device is further configured to control the output volume of the makeup pump in order to selectively direct the sample fluid to the column. In another non-limiting example, the computing device is further configured to measure a pressure across the first restrictor using pressure sensors upstream and downstream of the first restrictor.

According to another aspect of the technology, the present disclosure relates to a method for controlling fluid flow within a chromatography system. The method includes activating a mobile phase pump configured to pump a first mobile phase to a first column. The method also includes activating a makeup pump configured to pump a makeup fluid into the chromatography system downstream of the first column and upstream of a restrictor. The method also includes activating a second mobile phase pump configured to pump a second mobile phase into the chromatography system upstream of a second column, wherein the restrictor is positioned between the output of the makeup pump and the output of the second mobile phase pump. The method also includes measuring a pressure across the restrictor. The method also includes decreasing an output volume of the makeup pump in order to direct a portion of the output of the first column through the restrictor and to the input of the second column. The method also includes increasing the output volume of the makeup pump in order to direct substantially all of the output of the first column away from the restrictor. In a non-limiting example, the chromatography system is a $CO_2$-based chromatography system including a $CO_2$-based mobile phase. In another non-limiting example, increasing the output volume of the makeup pump directs substantially all of the output of the first column to a detector positioned downstream of the makeup pump and parallel to the second column. In another non-limiting example, the makeup fluid has a same composition as the second mobile phase entering the second column. In another non-limiting example, controlling the output volume of the makeup pump can selectively create a two-dimensional chromatography system. In another non-limiting example, measuring the pressure across the restrictor includes measuring the pressure using pressure sensors located upstream and downstream of the restrictor.

The above aspects of the technology provide numerous advantages. For example, systems and methods of the present technology allows for flow splitting and the introduction of a sample fluid without the need for valves by simply adjusting the output of a makeup pump. In particular, conventional systems do not have the ability to introduce a sample fluid or control mobile phase flow without valves. As a result, pressure changes caused by valve switching can damage restrictors, columns, or other elements within the chromatography system. Further, valves contain moving parts which wear and require maintenance, and reduce chromatographic performance due to band dispersion caused by fittings and additional system volume.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is an example block diagram of a chromatography system including a makeup pump and a fixed restrictor, according to an embodiment of the present disclosure.

FIG. 2B is another example block diagram of a chromatography system including a makeup pump and a fixed restrictor, according to an embodiment of the present disclosure.

The features and advantages of the present disclosure will become more apparent from the detailed description set forth below when taken in conjunction with the drawings.

DETAILED DESCRIPTION

Following below are more detailed descriptions of various concepts related to, and embodiments of, methodologies, apparatus and systems for sample introduction within a chromatography system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

A "restrictor" herein refers to a component used in a chromatography system that is used to regulate or decrease flow. In some embodiments a restrictor is also used to interface to a detection component. Non-limiting examples of restrictors include a length of straight, small internal diameter tubing, a tapered restrictor, a converging-diverging restrictor, an integral restrictor, or a fritted restrictor. Non-limiting examples of active restrictors include a variable restrictor, a thermally modulated variable restrictor, or a back pressure regulator.

Chromatography sometimes introduces a sample fluid into the flow stream of the chromatography system. The sample fluid may be introduced into the chromatography system downstream of a mobile phase pump and upstream of the column. In some cases, the sample fluid may be introduced during specific portions of a chromatographic run and diverted away from the mobile phase at other times. In some embodiments, a simple valve can be employed to direct the sample fluid flow to and away from the column.

Figure 1A:
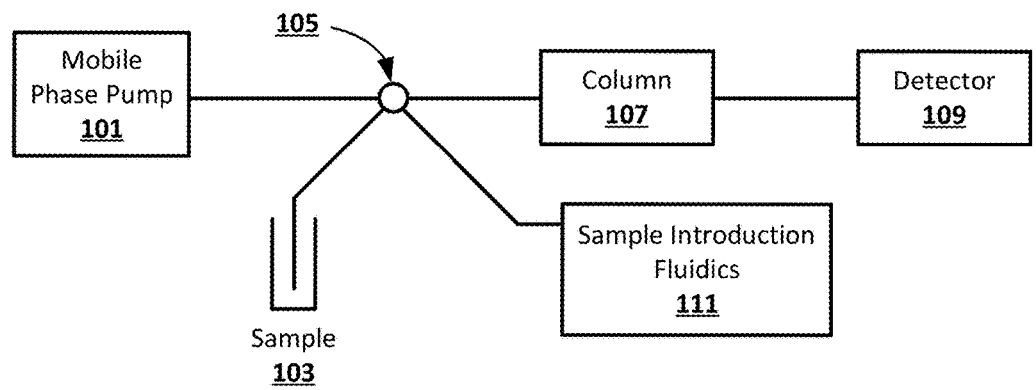
FIG. 1A is an example block diagram of a prior art chromatography system that utilizes a valve to direct fluid flow.

FIG. 1A illustrates an example block diagram of a prior art chromatography system that utilizes a valve or modulator 105 to direct fluid flow. A mobile phase pump 101 can direct a mobile phase to a chromatography column 107. The system can also include a modulator 105, such as a rotary shear valve or a two-position 6-port valve, which can change the flow direction through a sample loop. In one position, the modulator 105 connects a sample loop to sample introduction fluidics 111 and the sample 103 in order to load the sample 103. The modulator 105 can also switch to introduce the sample 103 into the chromatographic flow path through the column 107 and to a detector 109.

Figure 1B:
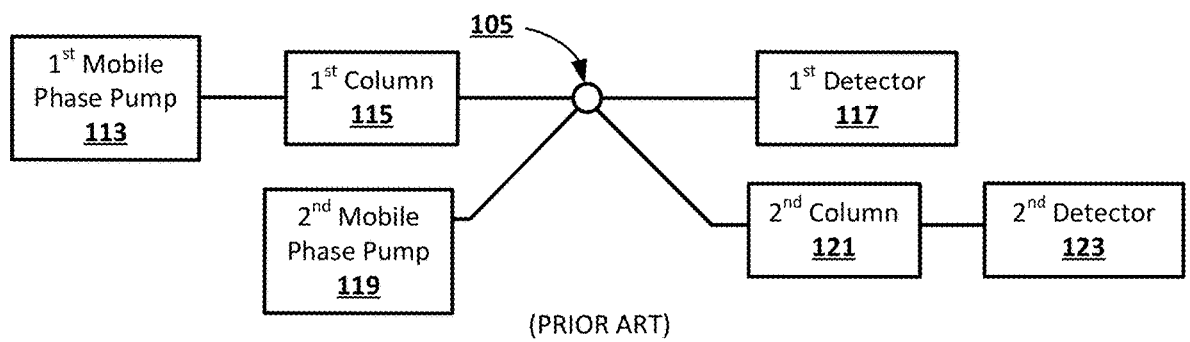
FIG. 1B is an example block diagram of a prior art multidimensional chromatography system that utilizes a valve to direct fluid flow.

FIG. 1B illustrates an example block diagram of a prior art multidimensional chromatography system that utilizes a modulator 105 to direct flow to a second column 121. A first mobile phase pump 113 can pump a mobile phase to a first column 115. The valve 105 can direct all or a portion of the output from the first column 115 to a first detector 117, or a portion of the output of the first column into a modulator 105 which introduces the portion of the output of the first column to a second column 121 and a second detector 123. The output from a second mobile phase pump 119 can also be directed into the chromatographic flow path using the modulator 105. A modulator can include valves, sample loops, or traps, in some embodiments.

The valve-based configuration described in FIGS. 1A-1B can cause pressure perturbations during the valve actuation, which can have negative effects within the chromatography system. Such valves may not be acceptable for use with compressible mobile phases, such as those encountered in $CO_2$-based chromatography systems, because such systems experience dramatic pressure fluctuations when the valve cycles.

Chromatography systems are widely used for separating a sample including analytes into its constituents. Due to their low cost and ease of manufacture, restrictors are implemented in many types of chromatography systems. The restrictor can be used to maintain system pressure in the chromatography system and to introduce a portion of the mobile phase flow to a detector. For example, a restrictor can be used to control the interface to a low-pressure detection component, such as but not limited to a mass spectrometry (MS) detection system, an evaporative light scattering detection system, or a flame ionization detection (FID) system.

FIG. 2A illustrates an example chromatography system where a makeup fluid is added downstream of the column 203 using a makeup pump 205. The makeup pump 205 can be configured to pump a solvent, such as $CO_2$ or a combination of $CO_2$ and a liquid modifier. In this embodiment, a portion of the combined makeup fluid and column output is directed to a back pressure regulator (BPR) 207 (or another suitable type of restrictor), while another portion is directed to the detector 211 via the restrictor 209. In the case of this splitter, like the one shown in FIG. 2A, the makeup fluid has a minimal effect on the split ratio. The split ratio is primarily affected by the pressure of the BPR 207 and, to a lesser extent, on the composition of the combined mobile phase and makeup fluid flow.

FIG. 2B illustrates an example chromatography system where the makeup pump 205 is configured to provide a makeup fluid downstream of the restrictor 209 between the detector 211 and the restrictor 209. In the case of the splitter shown in FIG. 2B, the makeup fluid has little effect on the split ratio because it is placed downstream of the restrictor 209. Further, this configuration allows for more precise control over the composition of the fluid entering the detector, but since there is post-decompression transport in this configuration, the splitter can suffer from poor robustness by allowing analytes or matrix components to precipitate out into the restrictor after mobile phase depressurization.

Figure 3:
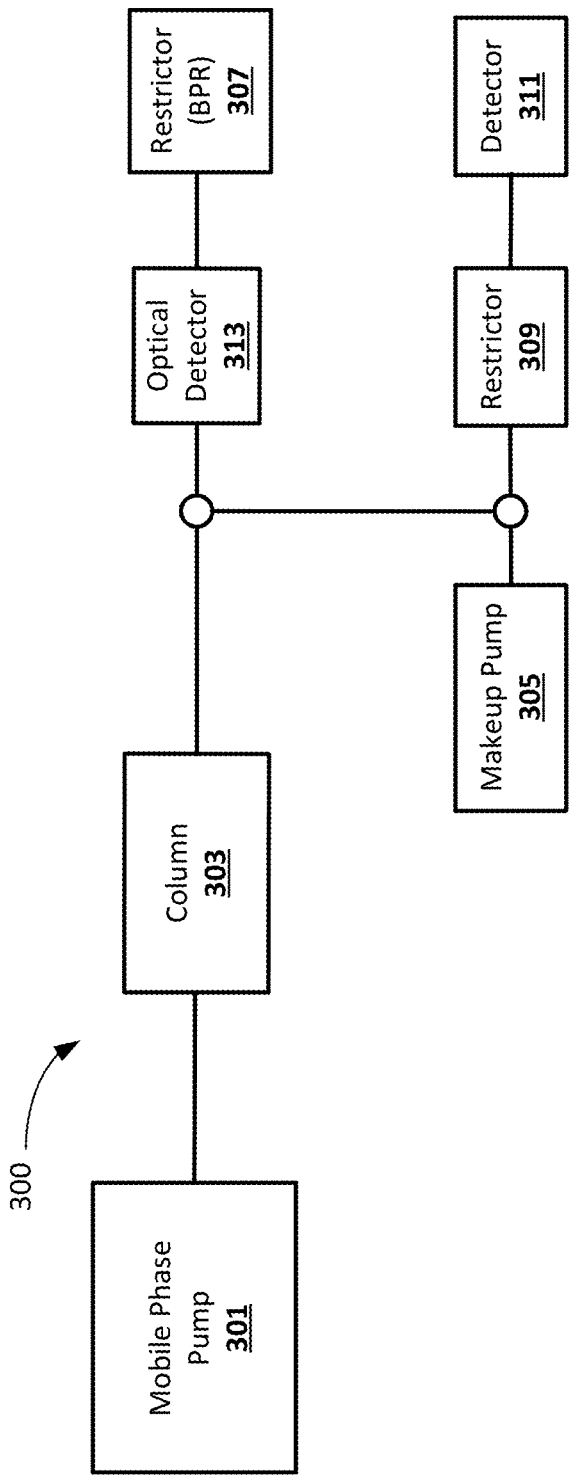
FIG. 3 is another example block diagram of a chromatography system including a makeup pump and a fixed restrictor, according to an embodiment of the present disclosure.

FIG. 3 shows an example block diagram of a chromatography system 300 including a makeup pump 305 and a restrictor 309, according to another embodiment of the present disclosure. The system acts as a splitter and includes a mobile phase pump 301 connected to the chromatography column 303. Although this design may be applicable to liquid chromatography mobile phases, it is particularly useful with a $CO_2$ based chromatography system with a highly compressible $CO_2$ mobile phase. In this particular example, the makeup pump 305 adds a makeup fluid upstream of the restrictor 309. Since the restrictor 309 only allows a certain fluid flow rate, the makeup fluid flow rate has a strong effect on the split ratio. The output of the column 303 is combined with a portion of the output of the makeup pump 305 upstream of an optical detector 313 and a BPR 307.

Figure 4:
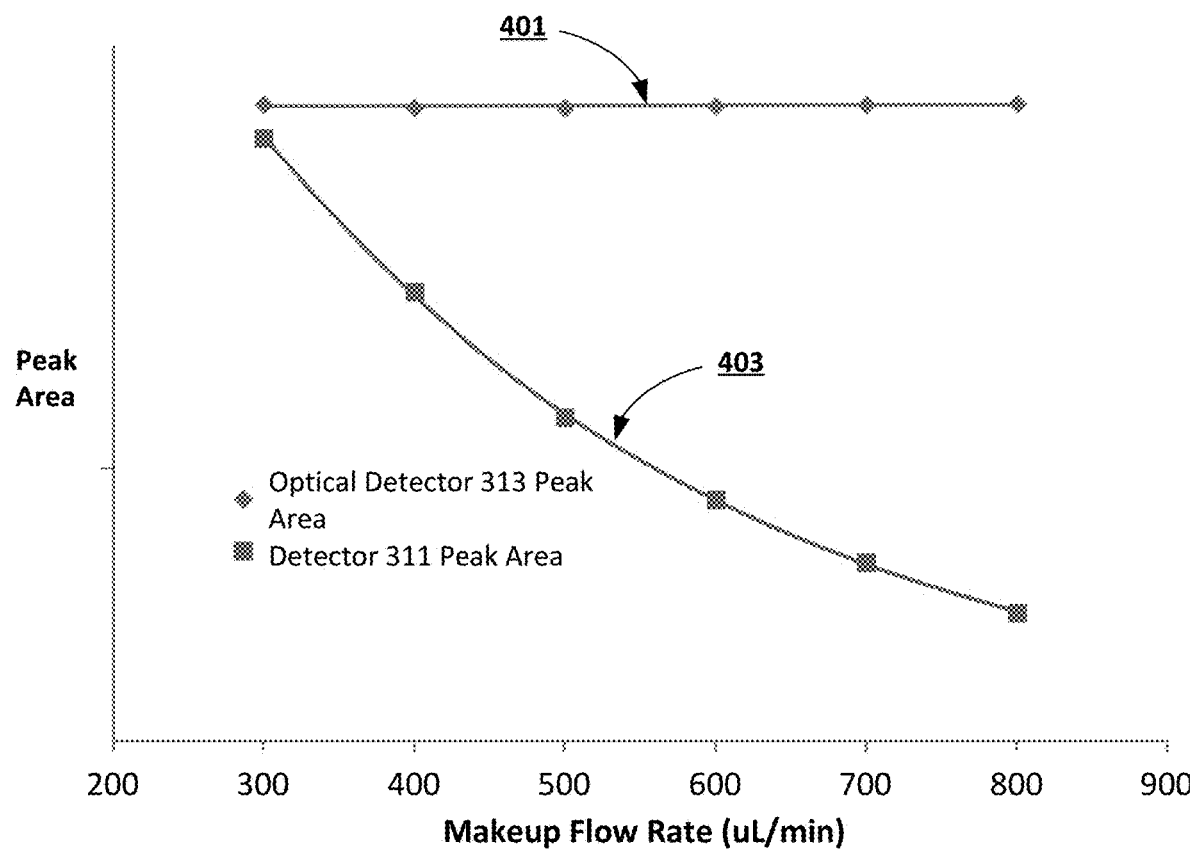
FIG. 4 is a graph showing the peak area measured at two locations along the chromatography system of FIG. 3.

FIG. 4 is a graph showing the peak area (y-axis) at the optical detector 313 and the detector 311 of FIG. 3 as the flow rate from the makeup pump 305 increases. As can be seen in this graph, the peak area of the peak passing through the detector 311 is shown in plot 401, which decreases as the makeup fluid flow rate increases from the makeup pump 305. Because the restrictor 309 is located between the makeup pump 305 and the detector 311, as the flow rate from the makeup pump 305 increases, the flow of makeup fluid backs up and begins flowing toward the optical detector 313, thus preventing any of the output from the column 303 from making it to the detector 311. This backflow of makeup fluid ahead of the restrictor 309 results in the decreasing peak area at the detector 311, which is shown in plot 403.

Figure 5A:
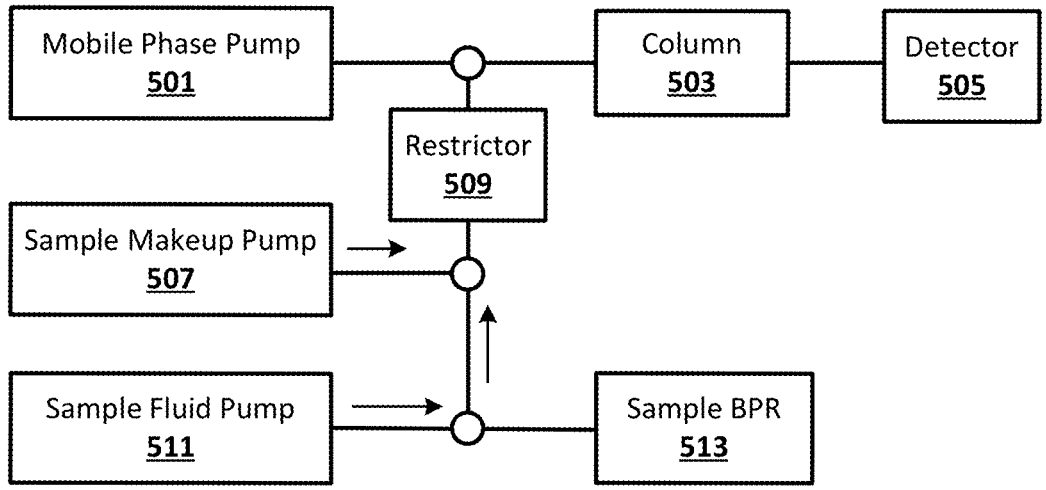
FIG. 5A is an example block diagram of an active splitter with a low makeup fluid flow rate from the sample makeup pump, according to an embodiment of the present disclosure.
Figure 5B:
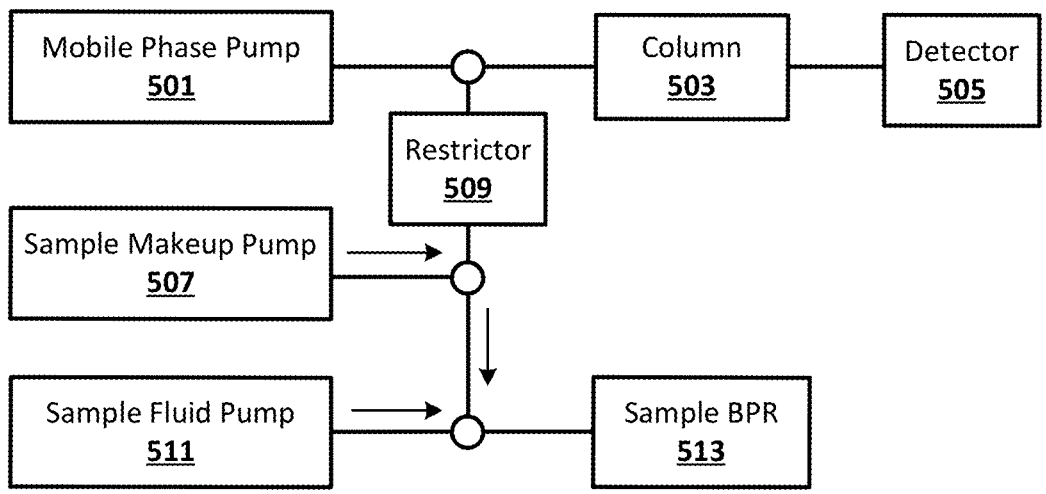
FIG. 5B is an example block diagram of an active splitter with a high makeup fluid flow rate from the sample makeup pump, according to an embodiment of the present disclosure.

FIGS. 5A and 5B show block diagrams of a flow modulated active splitter implemented with a sample makeup pump 507 and a restrictor 509, according to an embodiment of the present disclosure. The active splitter includes a mobile phase pump 501 configured to pump a mobile phase to a column 503 and a detector 505. A makeup pump 507 is configured to provide a makeup fluid, which can have the same composition as the mobile phase solvent. This solvent can include, for example, $CO_2$ or a combination of $CO_2$ and a liquid modifier, in some embodiments. The active splitter also includes a restrictor 509, sample fluid pump 511, and a sample BPR 513 (or another suitable restrictor).

FIG. 5A shows a non-limiting example of the active splitter with a low makeup fluid flow rate from the sample makeup pump 507 such that a portion of the fluid from the sample fluid pump 511 passes through the restrictor 509 and to the column 503 and the detector 505. This flow path can be achieved when the flow limit of the restrictor 509 is higher than the flow rate from the sample makeup pump 507.

FIG. 5B shows a non-limiting example of the active splitter with a high makeup fluid flow rate from the sample makeup pump 507 such that a backflow of makeup fluid is created at the restrictor 509. This flow path can be achieved when the flow rate from the sample makeup pump 507 is increased above the flow limit of the restrictor 509. When the backflow of the makeup fluid is created at the restrictor 509, all of the output from the sample fluid pump 511 is directed to the sample BPR 513 such that none of the sample passes through the restrictor 509 and reaches the column 503 and the detector 505. In this manner, the sample fluidics can be introduced to the column 503 with no moving parts or valves. This flow diversion technique offers additional benefits to $CO_2$-based chromatography systems because the restrictor is never depressurized. In this manner restrictor robustness can be significantly improved. Additionally, since flow is never stopped or valved, there is minimal system pressure perturbation when the diversion system is actuated. Further, there are no moving parts which require regular maintenance.

Figure 6:
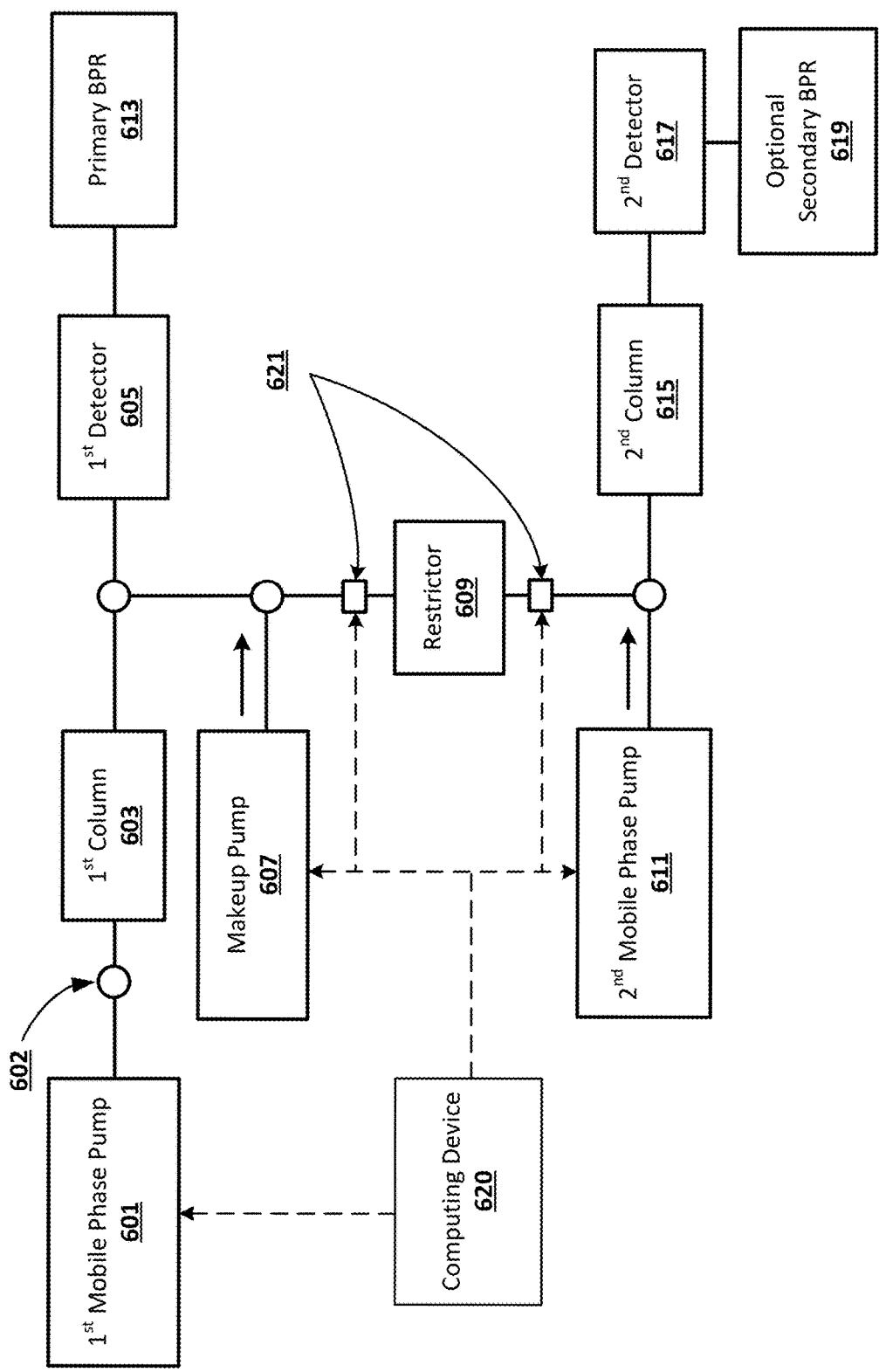
FIG. 6 is an example block diagram of a chromatography system including a makeup pump and a restrictor, according to an embodiment of the present disclosure.

FIG. 6 shows an example block diagram of a chromatography system including a makeup pump 607 and a restrictor 609, according to another embodiment of the present disclosure. The system 600 is suitable for the implementation of the method described below in FIG. 7 and acts as a splitter to selectively direct the output of a first chromatography column 603 to a second chromatography column 615 and a second detector 617. The chromatography system includes a mobile phase pump 601 configured to pump a mobile phase to a column 603. In some embodiments, a sample can be selectively introduced at 602 using an additional makeup pump and restrictor as discussed above in reference to FIGS. 5A-5B. The makeup pump 607 is configured to provide a makeup fluid, which can have the same composition as the mobile phase solvent from the first mobile phase pump 601. This solvent can include, for example, $CO_2$ or a combination of $CO_2$ and a liquid modifier, in some embodiments. Since the restrictor 609 only allows a certain fluid flow rate, the makeup fluid flow rate has a strong effect on the split ratio. In a non-limiting example, the makeup pump 607 can be configured to initially provide a flow rate of makeup fluid that is higher than the limit of the restrictor 609. Such a flow rate can cause a backflow of makeup fluid that directs the entirety of the output from the first column 603, along with a portion of the makeup fluid from the makeup pump 607, to the first detector 605 and the primary BPR 613.

In a non-limiting example, the flow rate of the makeup pump 607 can be decreased to a flow rate below the limit of the restrictor 609, such that the backflow of makeup fluid is eliminated and a portion of the makeup fluid and the output from the first column 603 passes through the restrictor 609 and is combined with the output from the second mobile phase pump 611. This combined fluid flow then passes to the second column 615 and to the second detector 617, in some embodiments. In chromatography systems utilizing a compressible mobile phase, such as a $CO_2$-based mobile phase, an optional secondary BPR 619 can be positioned downstream of the second detector 617. Although this design may be applicable to liquid chromatography mobile phases, it is particularly useful with a $CO_2$ based chromatography system with a highly compressible $CO_2$ mobile phase. In some embodiments, the primary BPR 613 and/or the optional secondary BPR 619 can be replaced with some other type of pressure-controlling component. For example, in some embodiments, not shown, the pressure-controlling component consists of a pressure controlling fluid pump. In a non-limiting example, the primary BPR 613 can be set so that the primary system pressure at the restrictor 609 is higher than the pressure at the second mobile phase pump 611. In this fashion, modulating the makeup fluid flow rate would allow a primary dimension mobile phase from the first column 603 to be introduced into the secondary dimension column 615.

In a non-limiting example, the system can include a computing device 620 that can be configured to control the operation of the first mobile phase pump 601, the makeup pump 607, and the second mobile phase pump 611. The computing device 620 can measure the pressure across the restrictor 609 using, for example, pressure sensors 621 located upstream and downstream of the restrictor 609. By measuring the pressure across the restrictor 609, the computing device 620 can determine the appropriate flow rates for the first mobile phase pump 601, the makeup pump 607, and the second mobile phase pump 611 in order to achieve the desired mobile phase flow through the first column 603 or the second column 615.

In a non-limiting example, this flow can be determined empirically by infusing an analyte and increasing the makeup flow until the signal at the detector 611 disappears. Conversely, one or more flow sensors 622 can be located at the restrictor to measure a flow rate with the makeup off in order to determine the approximate divert flow rate. In another embodiment, the restrictor 609 can be calibrated ahead of time to determine the divert flow rate. Factors relevant to determining divert flow rate can include, for example, restrictor dimensions, the BPR set point (i.e., pressure across the restrictor), and the composition of the makeup fluid In another non-limiting example, restrictor characteristics and fluid properties, such as viscosity, can be known or calculated. Restrictor characteristics can include, for example, the flow rate as a function of pressure (i.e., different flow rates of 200 mL/min or 20 mL/min can be possible with the same delta-P for two different restrictors). Upstream pressure can be set by the first BPR, while the downstream pressure may fluctuate depending on second dimension column and mobile phase flow/composition, in some embodiments.

Figure 7A:
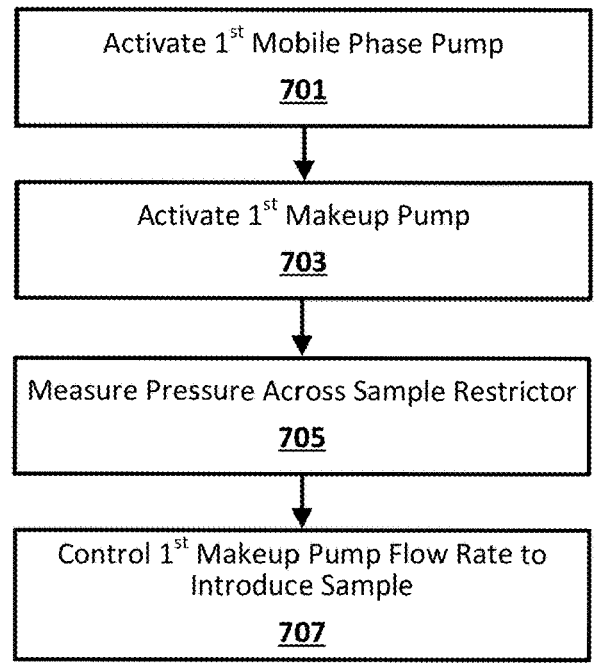
FIG. 7A is a flowchart illustrating an exemplary method for controlling fluid flow within a chromatography system, according to an exemplary embodiment.

FIG. 7A is a flowchart illustrating an exemplary method for controlling fluid flow within a chromatography system, according to an exemplary embodiment. It will be appreciated that the method can be programmatically performed, at least in part, by one or more computer-executable processes executing on, or in communication with, one or more servers or other computing devices such as those described further below. In step 701, the chromatography process is initiated by activating the first mobile phase pump. In some example embodiments, the chromatography system is a $CO_2$-based chromatography system, and the mobile phase is a $CO_2$-based mobile phase.

In step 703, a first sample makeup pump is activated to introduce a makeup fluid downstream of the first mobile phase pump, as shown in FIGS. 5A and 5B. In some non-limiting examples, the makeup fluid can include $CO_2$ or a combination of $CO_2$ and a liquid modifier.

In step 705, pressure is measured across a sample restrictor that is located downstream of the makeup pump and upstream of the first column. The pressure can be measured, in some embodiments, using pressure sensors located upstream and downstream of the sample restrictor. The sample restrictor can be located as shown and described above in reference to FIGS. 5A and 5B as restrictor element 509. This sample restrictor can limit the fluid flow to the first column from the sample makeup pump and sample introduction fluidics, as described above.

In step 707, the flow rate of the first sample makeup pump can be controlled in order to introduce a sample into the chromatographic flow going to the first column. As discussed above with reference to FIG. 5B, if the flow rate of the sample makeup pump is greater than the limit of the sample restrictor, then a backflow of makeup fluid is created and the sample fluid cannot pass through the sample restrictor and reach the first column. However, as discussed above with reference to FIG. 5A, if the flow rate of the sample makeup pump is decreased below the limit of the sample restrictor, some portion of the makeup fluid and the sample fluid can pass through the sample restrictor and reach the first column.

Figure 7B:
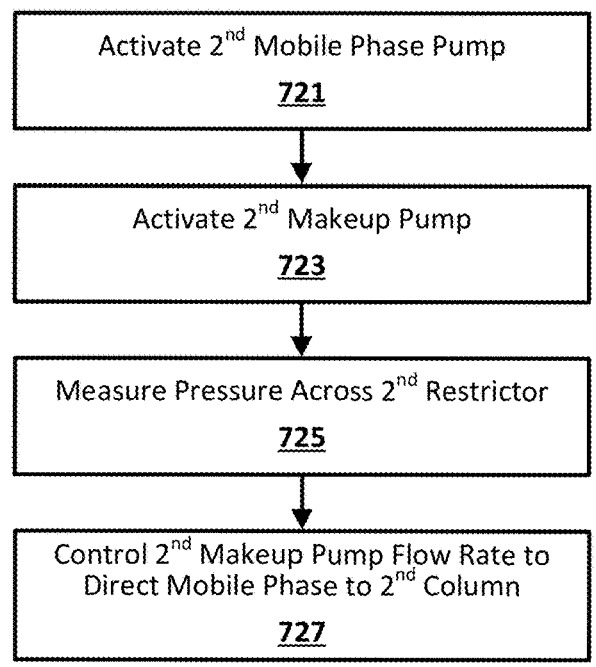
FIG. 7B is a flowchart illustrating another exemplary method for controlling fluid flow within a chromatography system, according to an exemplary embodiment.

FIG. 7B is a flowchart illustrating another exemplary method for controlling fluid flow within a chromatography system, according to an exemplary embodiment. It will be appreciated that the method can be programmatically performed, at least in part, by one or more computer-executable processes executing on, or in communication with, one or more servers or other computing devices such as those described further below. In step 721, the chromatography process is initiated by activating the second mobile phase pump. In some example embodiments, the chromatography system is a $CO_2$-based chromatography system, and the mobile phase is a $CO_2$-based mobile phase.

In step 723, a second makeup pump is activated to introduce the makeup fluid downstream of a first column, as shown in FIG. 6. In some non-limiting examples, the makeup fluid can include $CO_2$ or a combination of $CO_2$ and a liquid modifier.

In step 725, pressure is measured across a second restrictor that is located downstream of the makeup pump and upstream of the second column. The second restrictor can be located as shown and described above in reference to FIG. 6 as restrictor element 609. This sample restrictor can limit the fluid flow to the first column from the sample makeup pump and sample introduction fluidics, as described above. The pressure can be measured, in some embodiments, using pressure sensors located upstream and downstream of the sample restrictor as shown and described above in reference to FIG. 6.

In step 727, the flow rate of the second makeup pump can be controlled in order to introduce the mobile phase from the first column into the chromatographic flow going to the second column. As discussed above with reference to FIG. 6, if the flow rate of the makeup pump 607 is greater than the limit of the restrictor 609, then a backflow of makeup fluid is created and the mobile phase from the first column 603 cannot pass through the restrictor 609 and reach the second column 615. However, if the flow rate of the makeup pump 607 is decreased below the limit of the restrictor 609, some portion of the makeup fluid and the mobile phase from the first column 603 can pass through the restrictor 609 and reach the second column 615. In this way, a second makeup pump can be controlled in order to direct at least a portion of the output from a first column into a second column.

Figure 8:
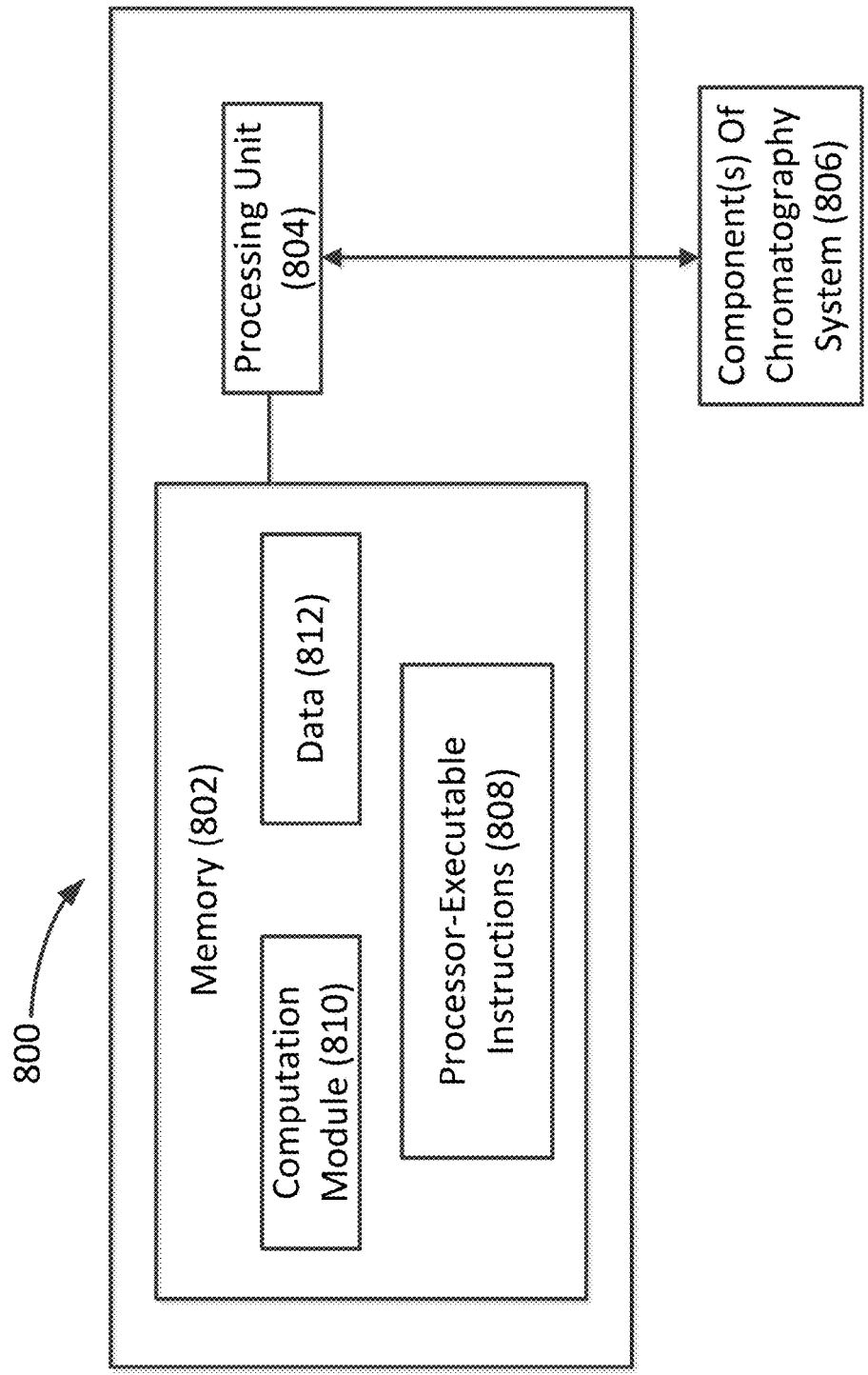
FIG. 8 shows an example apparatus that can be used to perform example processes and computations, according to principles of the present disclosure.

FIG. 8 shows a non-limiting example apparatus 800 that can be used to implement an example method for sample introduction within a chromatography system, according to the principles described herein. The apparatus 800 includes at least one memory 802 and at least one processing unit 804. The at least one processing unit 804 is communicatively coupled to the at least one memory 902 and also to at least one component of a chromatography system 906.

The at least one memory 802 is configured to store processor-executable instructions 808 and a computation module 810. In an example method, as described in connection with FIG. 7, the at least one processing unit 804 can execute processor-executable instructions 808 stored in the memory 802 to cause the computation module 810 to compute a desired makeup fluid flow rate for a first and second makeup pump and generate processor executable instructions 808 configured to increase or decrease the flow rate of the makeup pumps. The computation module 810 can also be used to compare pressure values measured across one or more restrictors and flow rates from one or more mobile phase pumps. Such values can be compared using, for example, a lookup table or database in order to determine a desired flow rate for the makeup pumps described above.

Figure 9:
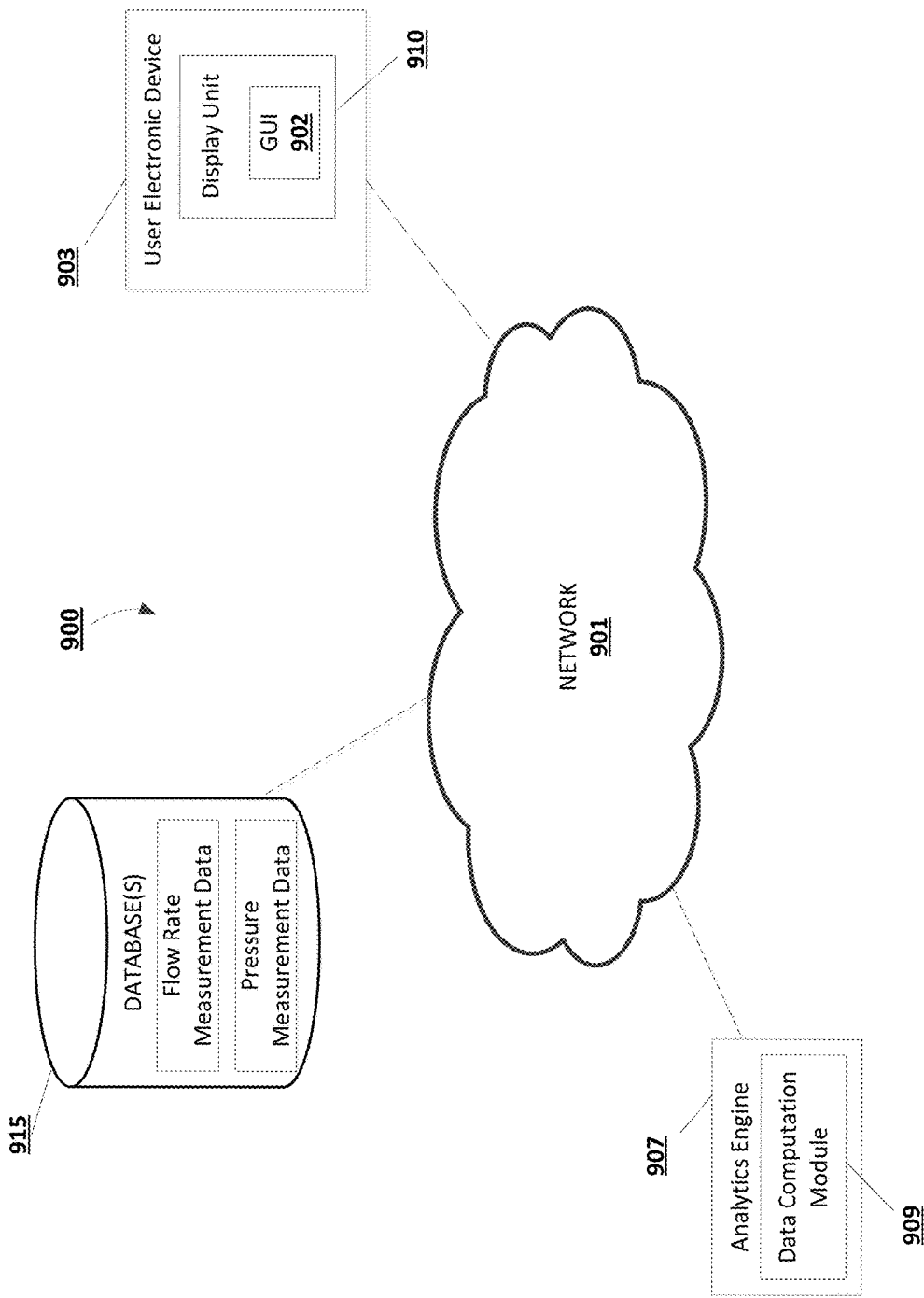
FIG. 9 is a diagram of an example network environment suitable for a distributed implementation, according to principles of the present disclosure.

FIG. 9 illustrates a network diagram depicting a system 900 suitable for a distributed implementation of example systems described herein. The system 900 can include a network 901, a user electronic device 903, an analytics engine 907, and a database 915. As will be appreciated, the analytics engine 907 can be local or remote servers, and various distributed or centralized configurations may be implemented, and in some embodiments a single server can be used. In exemplary embodiments, the analytics engine 907 can include one or more modules 909, which can implement one or more of the processes described herein, or portions thereof, with reference to FIG. 7. For example, the analytics engine 907 can include a data computation module 909 configured to perform one or more of the processes or steps described in connection with FIG. 7. The user electronic device 903 and analytics engine 907 can communicate with each other and with the database 915 and at least one component of the chromatography system to control a flow of mobile phase within a chromatography system and introduce a sample and/or divert a mobile phase to a second chromatography column, in some embodiments.

In exemplary embodiments, the user electronic device 903 may include a display unit 910, which can display a GUI 902 to a user of the device 903 such that the user can view the rendered graphic icon, visual display, or other type of signal used to indicate a current mobile phase flow path and/or sample flow path, as described above. The user electronic device 903 may include, but is not limited to, smart phones, tablets, ultrabooks, netbooks, laptops, computers, general purpose computers, Internet appliances, hand-held devices, wireless devices, portable devices, wearable computers, cellular or mobile phones, portable digital assistants (PDAs), desktops, multi-processor systems, microprocessor-based or programmable consumer electronics, game consoles, set-top boxes, network PCs, mini-computers, and the like. The user electronic device 903 may include some or all components described in relation to computing device 1000 shown in FIG. 10. The user electronic device 903 may connect to network 901 via a wired or wireless connection. The user electronic device 903 may include one or more applications such as, but not limited to, a web browser, a sales transaction application, an object reader application, and the like.

In exemplary embodiments, the user electronic device 903, analytics engine 907, and database 915 may be in communication with each other via a communication network 901. The communication network 901 may include, but is not limited to, the Internet, an intranet, a LAN (Local Area Network), a WAN (Wide Area Network), a MAN (Metropolitan Area Network), a wireless network, an optical network, and the like. In one embodiment, the user electronic device 903, and analytics engine 907 can transmit instructions to each other over the communication network 901. In exemplary embodiments, the flow rate measurement data, pressure measurement data, and other data can be stored at database 915 and received at the analytics engine 907.

Figure 10:
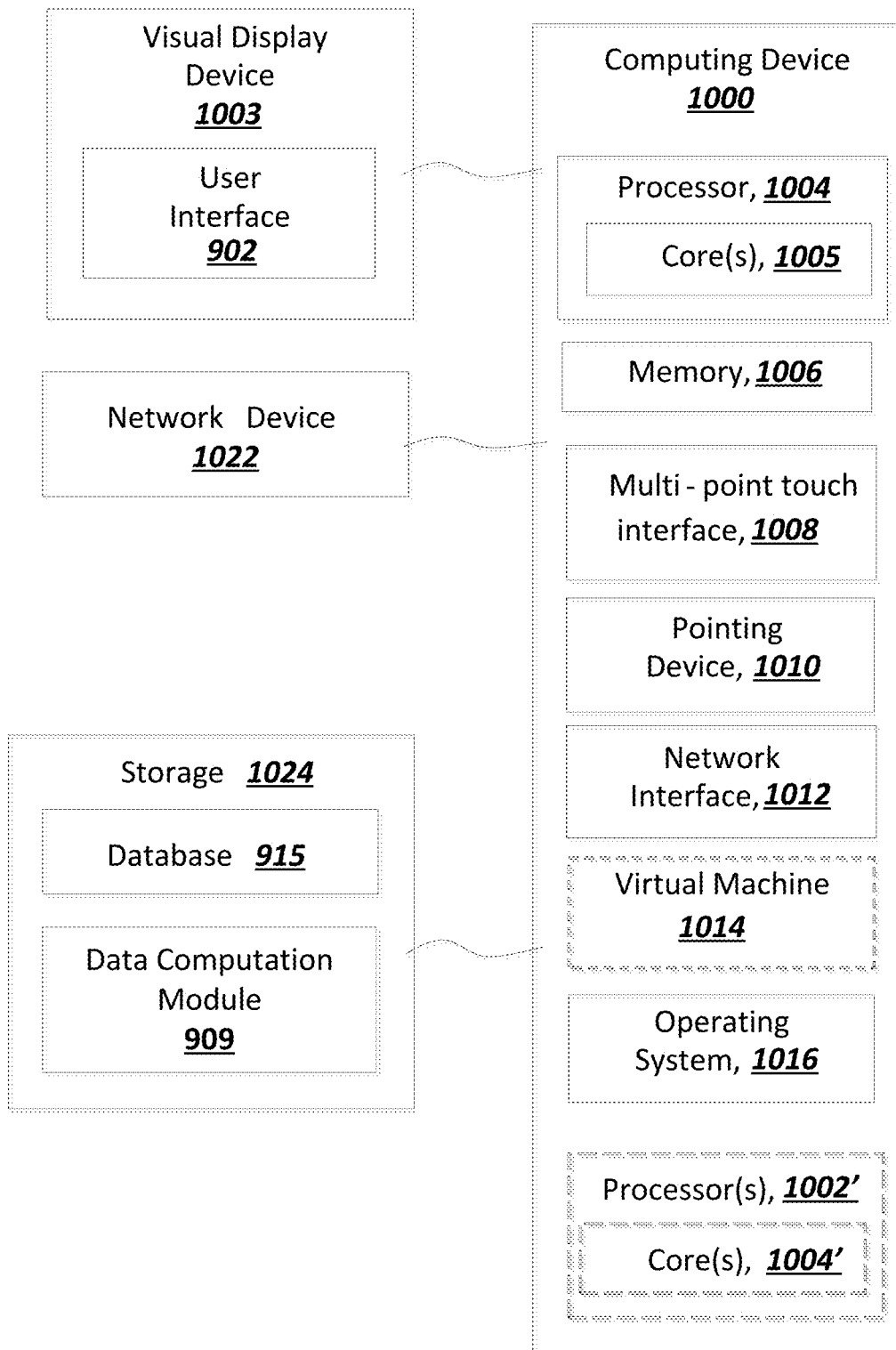
FIG. 10 is a block diagram of an example computing device that can be used to perform example processes and computations, according to principles of the present disclosure.

FIG. 10 is a block diagram of an exemplary computing device 1000 that can be used in the performance of any of the example methodologies according to the principles described herein (including example methodologies associated with FIG. 7). The computing device 1000 includes one or more non-transitory computer-readable media for storing one or more computer-executable instructions (such as but not limited to software or firmware) for implementing any example method according to the principles described herein (including example methodologies associated with FIG. 7). The non-transitory computer-readable media can include, but are not limited to, one or more types of hardware memory, non-transitory tangible media (for example, one or more magnetic storage disks, one or more optical disks, one or more USB flashdrives), and the like.

For example, memory 1006 included in the computing device 1000 can store computer-readable and computer-executable instructions or software for implementing exemplary embodiments and programmed to perform processes described above in reference to FIG. 7 (including processor-executable instructions 808). The computing device 1000 also includes processing unit 1004 (and associated core 1005), and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processing unit 1004 and processor(s) 1002' can each be a single core processor or multiple core (1005 and 1004') processor.

Virtualization can be employed in the computing device 1000 so that infrastructure and resources in the computing device can be shared dynamically. A virtual machine 1014 can be provided to handle a process running on multiple processors so that the process appears to be using only one computing resource rather than multiple computing resources. Multiple virtual machines can also be used with one processor.

Memory 1006 can be non-transitory computer-readable media including a computer system memory or random access memory, such as DRAM, SRAM, EDO RAM, and the like. Memory 1006 can include other types of memory as well, or combinations thereof.

A user can interact with the computing device 1000 through a visual display device 1003, such as a touch screen display or computer monitor, which can display one or more user interfaces 902 that can be provided in accordance with exemplary embodiments. The computing device 1000 can also include other I/O devices for receiving input from a user, for example, a keyboard or any suitable multi-point touch interface 1008, a pointing device 1010 (e.g., a pen, stylus, mouse, or trackpad). The keyboard 1008 and the pointing device 1010 can be coupled to the visual display device 1003. The computing device 1000 can include other suitable conventional I/O peripherals.

The computing device 1000 can also include one or more storage devices 1024, such as a hard-drive, CD-ROM, or other non-transitory computer readable media, for storing data and computer-readable instructions and/or software, such as a data computation module 909 that can implement exemplary embodiments of the methodologies and systems as taught herein, or portions thereof. The databases can be updated by a user or automatically at any suitable time to add, delete, or update one or more items in the databases. Exemplary storage device 1024 can store one or more databases 915 for storing flow rate measurement data, pressure measurement data, and any other data/information used to implement exemplary embodiments of the systems and methodologies described herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 can run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1016 can be run in native mode or emulated mode. In an exemplary embodiment, the operating system 1016 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

In alternative embodiments, the techniques described above with respect to pumps and other elements used in $CO_2$-based chromatography systems may be applicable to pumps and other elements used in other types of chromatography systems that include mobile phases that vary greatly in density with minor changes in temperature. For example, a mobile phase including methanol at extremely high pressures may in some instances benefit from the flow splitting techniques described herein. In describing certain examples, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the disclosure.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methodologies, if such features, systems, articles, materials, kits, and/or methodologies are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for introducing a sample within a chromatography system, the method comprising:
   activating a mobile phase pump configured to pump a mobile phase to a column;
   activating a makeup pump configured to pump a makeup fluid into the chromatography system upstream of the column through a first restrictor;
   introducing a sample fluid to an output from the makeup pump upstream of the first restrictor;
   measuring a pressure across the first restrictor, wherein the first restrictor is located upstream of the column and a detector and downstream of the makeup pump;
   decreasing an output volume of the makeup pump in order to direct a portion of the sample fluid through the first restrictor and to the column and the detector; and
   increasing an output volume of the makeup pump in order to direct the sample fluid to a second restrictor located downstream of the makeup pump and in parallel with the column and the detector.

2. The method of claim 1, wherein the chromatography system is a $CO_2$-based chromatography system including a $CO_2$-based mobile phase.

3. The method of claim 1, further comprising:
   determining a maximum amount of fluid directed to the column based on a maximum flow value of the first restrictor.

4. The method of claim 3, wherein decreasing the output volume of the makeup pump below the maximum flow value of the first restrictor directs a portion of the sample fluid through the first restrictor and to the column and the detector.

5. The method of claim 1, further comprising:
   pumping a makeup fluid having a same composition as a mobile phase solvent entering the column using the makeup pump.

6. The method of claim 1, further comprising:
   controlling the output volume of the makeup pump in order to selectively direct the sample fluid to the column.

7. The method of claim 1, wherein measuring the pressure across the first restrictor includes measuring the pressure using pressure sensors located upstream and downstream of the first restrictor.

8. A method for controlling fluid flow within a chromatography system, the method comprising:
   activating a mobile phase pump configured to pump a first mobile phase to a first column;
   activating a makeup pump configured to pump a makeup fluid into the chromatography system downstream of the first column and upstream of a restrictor;
   activating a second mobile phase pump configured to pump a second mobile phase into the chromatography system upstream of a second column, wherein the restrictor is positioned between the output of the makeup pump and the output of the second mobile phase pump;
   measuring a pressure across the restrictor;
   decreasing an output volume of the makeup pump in order to direct a portion of the output of the first column through the restrictor and to the input of the second column; and
   increasing the output volume of the makeup pump in order to direct substantially all of the output of the first column away from the restrictor.

9. The method of claim 8, wherein the chromatography system is a $CO_2$-based chromatography system including a $CO_2$-based mobile phase.

10. The method of claim 8, wherein increasing the output volume of the makeup pump directs substantially all of the output of the first column to a detector positioned downstream of the makeup pump and parallel to the second column.

11. The method of claim 8, wherein the makeup fluid has a same composition as the second mobile phase entering the second column.

12. The method of claim 8, further comprising:
    controlling the output volume of the makeup pump in order to selectively create a two-dimensional chromatography system.

13. The method of claim 8, wherein measuring the pressure across the restrictor includes measuring the pressure using pressure sensors located upstream and downstream of the restrictor.

* * * * *